Patented Apr. 23, 1929.

1,710,024

UNITED STATES PATENT OFFICE.

WILLIAM T. INGRAHAM, OF DOVER, NEW JERSEY.

SMOKELESS POWDER AND METHOD OF TREATING THE SAME.

No Drawing. Application filed July 24, 1925. Serial No. 45,870.

(GRANTED UNDER THE ACT OF MARCH 3, 1883, AS AMENDED APRIL 30, 1928; 370 O. G. 757.)

The invention described herein may be manufactured and used by or for the Government for governmental purposes without the payment to me of any royalty thereon.

This invention relates to smokeless powder and to a method of treating the same.

The principal object of the invention is to reduce the hygroscopicity and alter the ballistic properties of grains of smokeless powder.

The invention consists in treating powder grains to form a glaze on their surface. This glaze may be formed by the action of a suitable solvent on the nitrocellulose of the powder.

As an example of such treatment, I may employ acetone or acetone diluted with water or any other diluent, or any of the other well known solvents for cellulose in place of the acetone, and moisten the surface of the powder grains with the solvent or diluted solvent, which moistening may conveniently be carried out by dipping the powder grains in the solvent. Powder so treated when exposed to an atmosphere saturated with moisture will absorb approximately 70% less moisture than powder which has not been so treated.

I have also discovered that the treatment of the powder in this manner to form a glaze on the surface of the grains alters the ballistic properties by reducing the rate of combustion. This is of practical importance in that for various purposes a slow burning powder may be desired in grains of small size or an available supply of powder in small grain form intended for use in a gun of specified caliber may be utilized after treatment in guns of larger caliber.

The term "smokeless powder" as used in the specification and claims is to be understood as referring to that class of powder having as its principal ingredient a nitrocellulose which has been colloided with a suitable colloiding agent and which has been formed into desired shapes commonly known as grains.

I claim:

1. A method of producing smokeless powder which embodies, forming the powder by any of the well known methods, gelatinizing, graining and drying the same, and then dipping the grains in a solvent for nitrocellulose.

2. The method of altering the ballistic properties of smokeless powder by forming a glaze on the surface of each powder grain.

3. The method of altering the ballistic properties of smokeless powder by treating the surface of each grain with acetone.

4. The method of altering the ballistic properties of smokeless powder by treating the surface of each grain with a solvent for nitrocellulose.

WILLIAM T. INGRAHAM.